United States Patent
Kanauchi et al.

(10) Patent No.: US 8,532,058 B2
(45) Date of Patent: Sep. 10, 2013

(54) MOBILE STATION AND MOBILE COMMUNICATION METHOD

(75) Inventors: Masashi Kanauchi, Yokosuka (JP); Hiroaki Yamagishi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 138 days.

(21) Appl. No.: 13/054,340

(22) PCT Filed: Jul. 15, 2009

(86) PCT No.: PCT/JP2009/062817
§ 371 (c)(1), (2), (4) Date: Apr. 8, 2011

(87) PCT Pub. No.: WO2010/008024
PCT Pub. Date: Jan. 21, 2010

(65) Prior Publication Data
US 2011/0182240 A1    Jul. 28, 2011

(30) Foreign Application Priority Data
Jul. 15, 2008 (JP) .................................. 2008-184193

(51) Int. Cl.
*H04W 4/00*  (2009.01)
(52) U.S. Cl.
USPC ........................................................ 370/331
(58) Field of Classification Search
None
See application file for complete search history.

(56) References Cited

U.S. PATENT DOCUMENTS

| 7,899,939 B2* | 3/2011 | Carpenter et al. | 709/250 |
| 2008/0009324 A1* | 1/2008 | Patel | 455/566 |
| 2009/0247160 A1* | 10/2009 | Muller | 455/435.3 |
| 2009/0279503 A1* | 11/2009 | Chin et al. | 370/331 |

FOREIGN PATENT DOCUMENTS

| CA | 2595740 A1 | 2/2008 |
| EP | 1 921 882 A1 | 5/2008 |
| EP | 2 190 228 A1 | 5/2010 |
| JP | 2004-187104 A | 7/2004 |
| JP | 2006-222774 A | 8/2006 |
| JP | 2007-201909 A | 8/2007 |
| JP | 2008-42913 A | 2/2008 |
| JP | 2008-061015 A | 3/2008 |

(Continued)

OTHER PUBLICATIONS

Notice of Grounds for Rejection for Japanese Patent Application No. 2008-184193 mailed May 22, 2012, with English translation thereof (5 pages).

(Continued)

*Primary Examiner* — Chirag Shah
*Assistant Examiner* — Rina Pancholi
(74) *Attorney, Agent, or Firm* — Osha Liang LLP

(57) ABSTRACT

A mobile station (UE) according to the present invention includes: a storage unit (23) configured to store first RAT priority information; a receiving unit (13) configured to receive second RAT priority information and RAT indication information from a radio base station; a camp-on processing unit (12) configured to camp on a cell of a second RAT designated by the second RAT priority information, when a first RAT designated by the first RAT priority information is different from the second RAT, and when the first RAT coincides with a third RAT designated by the RAT indication information; and a display unit (31) configured to show that the mobile station (UE) is camping on the first RAT, when the first RAT is different from the second RAT, and when the first RAT coincides with the third RAT.

5 Claims, 2 Drawing Sheets

(56) References Cited

FOREIGN PATENT DOCUMENTS

| | | | |
|---|---|---|---|
| JP | 2008-147761 A | | 6/2008 |
| WO | 2007/026679 A1 | | 3/2007 |
| WO | WO/2007/026679 | * | 3/2007 |
| WO | 2009/025241 A1 | | 2/2009 |

OTHER PUBLICATIONS

Patent Abstract for Japanese Publication No. 2008-42913 published Feb. 21, 2008 (1 page).

Telecom Italia, et al., "Support for RAT indicator in idle mode", 3GPP TSG-RAN WG2 Meeting #62, R2-082241, Kansas City, USA, May 5-9, 2008, 3 pages.

3GPP TS 23.122 V10.1.0, "Non-Access-Stratum (NAS) functions related to Mobile Station (MS) in idle mode," (2010-09), 41 pages.

3GPP TS 36.304 V.9.4.0, "Evolved Universal Terrestrial Radio Access (E-UTRA); User Equipment (UE procedures in idle mode)", (Sep. 2010), 32 pages.

3GPP TS 36.331 V9.4.0 "Evolved Universal Terrestrial Radio Access (E-UTRA); Radio Resource Control (RRC), Protocol specification," (SEP. 2010), 252 pages.

3GPP TS 25.331 V10.1.0, "Technical Specification Group Radio Access Network; Radio Resource Control (RRC); Protocol specification," (Sep. 2010); 1,806 pages.

International Search Report for PCT/JP2009/062817, mailed Aug. 18, 2009, with English translation, 4 pages.

Office Action for Chinese Application No. 200980127822.3 dated Apr. 1, 2013, with English translation thereof (14 pages).

3GPP TS 36.304 V8.2.0; "3rd Generation Partnership Project; Technical Specification Group Radio Access Network; Evolved Universal Terrestrial Radio Access (E-UTRA); User Equipment (UE) procedures in idle mode (Release 8)"; (May 2008) (27 pages).

* cited by examiner

MOBILE STATION AND MOBILE COMMUNICATION METHOD

TECHNICAL FIELD

The present invention relates to a mobile station and a mobile communication method.

BACKGROUND ART

In a mobile communication system before the LTE (Long Term Evolution) scheme is introduced, a mobile station UE has been configured to determine a cell of which RAT (Radio Access Technology) the mobile station UE should camp on or a cell of which RAT the mobile station UE should communicate with, based on "RAT priority information" notified via the "NAS (Non Access Stratum) protocol".

SUMMARY OF THE INVENTION

Problems to be Solved by the Invention

However, in a mobile communication system of the LTE scheme, notification of the RAT priority information to a mobile station UE not only via the NAS protocol but also via the "AS (Access Stratum) protocol" has been studied.

This causes the following problem. When the RAT designated by the RAT priority information notified via the NAB protocol is different from the RAT designated by the RAT priority information notified via the As protocol, the mobile station UE cannot determine a cell of which RAT the mobile station UE should camp on or a cell of which RAT the mobile station UE should communicate with.

Hence, the present invention has been made in view of the above-described problem, and it is an object of the invention to provide a mobile station and a mobile communication method that enable camping on or communicating with a cell of an appropriate RAT, even when multiple pieces of RAT priority information for designating different RATs are received.

Means for Solving the Problem

A first aspect of the present invention is summarized as a mobile station including: a storage unit configured to store first radio access technology priority information; a receiving unit configured to receive second radio access technology priority information and radio access technology indication information from a radio base station; a camp-on processing unit configured to camp on a cell of a second radio access technology designated by the second radio access technology priority information, when a first radio access technology designated by the first radio access technology priority information is different from the second radio access technology, and when the first radio access technology coincides with a third radio access technology designated by the radio access technology indication information; and a display unit configured to show that the mobile station is camping on the first radio access technology, when the first radio access technology is different froth the second radio access technology, and when the first radio access technology coincides with the third radio access technology.

A second aspect of the present invention is summarized as a mobile communication method including the steps of notifying, to a mobile station that stores first radio access technology priority information, second radio access technology priority information and radio access technology indication information; camping, by the mobile station, on a cell of a second radio access technology designated by the second radio access technology priority information, when a first radio access technology designated by the first radio access technology priority information is different from the second radio access technology, and when the first radio access technology coincides with a third radio access technology designated by the radio access technology indication information; and showing, by the mobile station, that the mobile station is camping on the first radio access technology, when the first radio access technology is different from the second radio access technology, and when the first radio access technology coincides with the third radio access technology.

Effects of the Invention

As described above, according to the present invention, it is possible to provide a mobile station and a mobile communication method that enable camping on or communicating with a cell of an appropriate RAT, even when multiple pieces of RAT priority information for designating different RATs are received.

MODE FOR CARRYING OUT THE INVENTION (Configuration of Mobile Communication System According to First Embodiment of Present Invention)

A configuration of a mobile communication system according to the first embodiment of the present invention is described with reference to FIGS. 1 and 2. Hereinafter, a mobile communication system into which the LTE scheme defined by the 3GPP Release.8 is introduced is described as an example.

Figure 1:
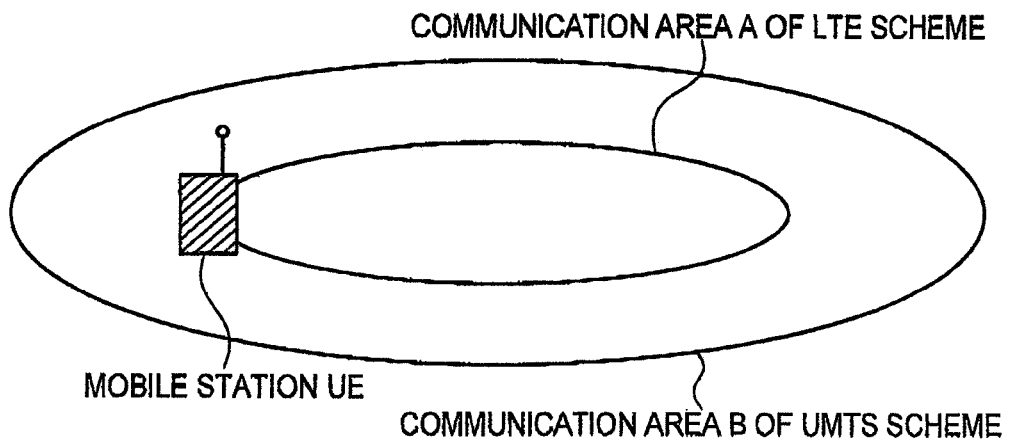
FIG. 1 is an overall configuration diagram of a mobile communication system according to a first embodiment of the present invention.

As shown in FIG. 1, in a mobile communication system according to the present embodiment, a communication area A for the LTE scheme and a communication area B for the UMTS scheme are placed so as to be geographically overlapped with each other in part.

In such a mobile communication system, a radio base station eNB in the LTE scheme is configured to notify, to a mobile station UE in a cell under the control of the radio base station eNB, second RAT priority information (second radio access technology priority information) by using broadcast information in the AS protocol.

In addition, in such a mobile communication system, a radio base station eNB in the LTE scheme is configured to notify, a mobile station UE in a cell under the control of the radio base station eNB, the second RAT priority information by using dedicated signaling information (for example, RRC CONNECTION RELEASE message) in the AS protocol.

Note that the above-mentioned second RAT priority information designates a RAT to be preferentially used by the mobile station UE. The above-mentioned second RAT priority information may designate one or more RATs to be preferentially used by the mobile station UE.

Specifically, the RAT is a radio communication system used in a radio access network, and includes, for example, radio communication systems such as the LTE scheme, the UMTS scheme, and the GSM scheme.

A mobile station UE according to the present embodiment is configured to be capable of camping on or communicating with cells of multiple RATs.

Figure 2:
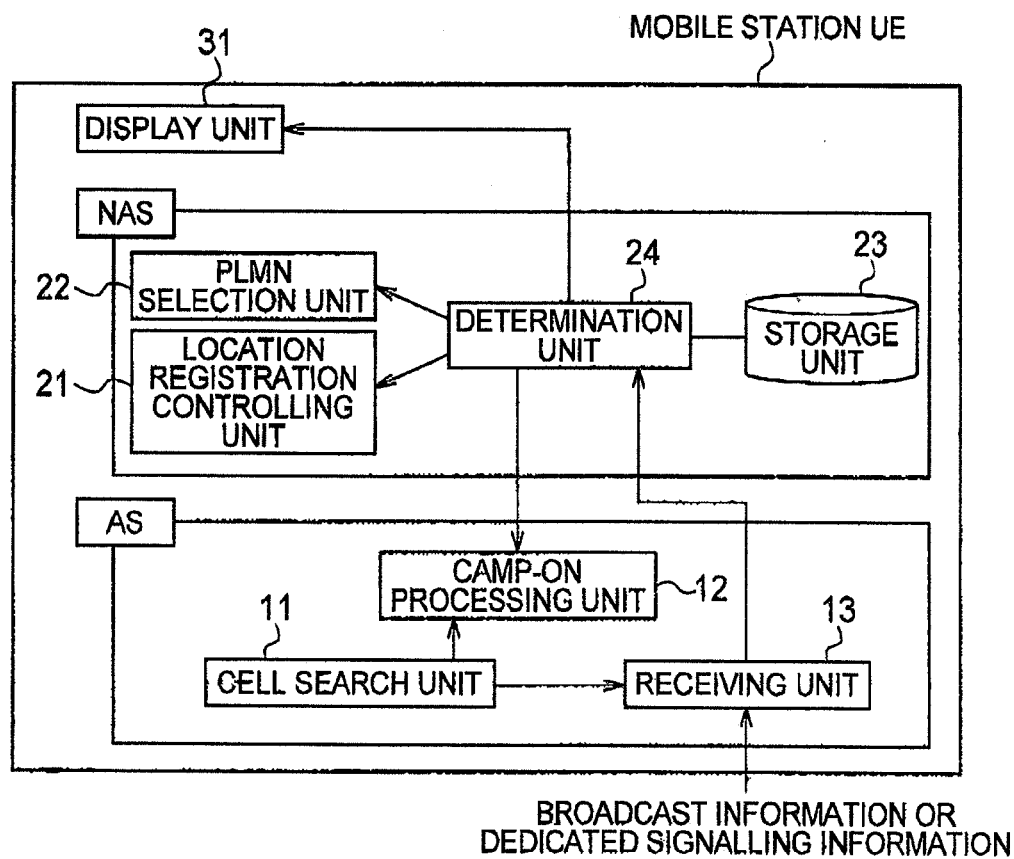
FIG. 2 is a functional block diagram of a mobile station according to the first embodiment of the present invention.

As shown in FIG. 2, the mobile station UE includes a cell search unit 11, a camp-on processing unit 12, and a receiving unit 13, as the AS protocol functions.

In addition, the mobile station UE includes a location registration controlling unit 21, a PLMN (Public Land Mobile Network) selection unit 22, a storage unit 23, and a determination unit 24, as the NAS protocol functions. Furthermore, the mobile station UE includes a display unit 31.

The cell search unit 11 is configured to perform cell search processing according to a predetermined trigger.

The camp-on processing unit 12 is configured to temporarily camp on the cell acquired by the cell search unit 11, until an instruction is received from the determination unit 24. In such case, the mobile station UE is in the "any cell camp on state" defined in the 3GPP, thus is in a state of camping on the cell without performing location registration processing.

In addition, the camp-on processing unit 12 is configured to select a cell which the mobile station UE camps on out of the cells of multiple RATs, in response to a notification from the determination unit 24.

The camp-on processing unit 12 is configured to camp on a cell of the second RAT, for example, when the camp-on processing unit 12 is notified by the determination unit 24 that the first RAT (the first Radio Access Technology) designated by the first RAT priority information (the first RAT priority, the first Radio Access Technology priority information) to be described later is different from the second RAT (the second Radio Access Technology) designated by the second RAT priority information, and the first RAT coincides with the third RAT (the third Radio Access Technology) designated by RAT indication information (RAT Indicator, Radio Access Technology indication information).

Note that the RAT indication information designates a target RAT for "connection destination re-selection indication (Re-direction) processing", at the time when the mobile station UE starts communication. Specifically, the connection destination re-selection indication processing is defined in the 3GPP, and makes the mobile station UE start communication using a RAT of a different type from the RAT related to a communication start request transmitted by the mobile station UE. For example, while the mobile station UE has transmitted a communication start request using the UMTS scheme, the connection destination re-selection indication processing makes the mobile station UE start communication using the LTE scheme.

More specifically, the camp-on processing unit 12 may be configured to camp on a cell of the second RAT, when the scamp-on processing unit 12 is notified by the determination unit 24 that the first RAT is different from the second RAT, the first RAT coincides with the third RAT, and the mobile communication system compatible with the second RAT is not unusable.

Note that the camp-on processing unit 12 is configured to camp on a cell of the first RAT (or the second RAT), when the camp-on processing unit 12 is notified by the determination unit 24 that the first RAT is the same as the second RAT.

The receiving unit 13 is configured to receive the broadcast information transmitted in the cell acquired by the cell search unit 11. For example, the receiving unit 13 is configured to receive the broadcast information transmitted from a radio base station eNB of the LTE scheme via a BCH (Broadcast Channel).

Moreover, the receiving unit 13 is configured to extract cell identification information, location registration area information, the second RAT priority information, and the RAT indication information, from the received broadcast information, and then to transmit the information to the determination unit 24.

Furthermore, the receiving unit 13 is configured to receive dedicated signaling information. For example, the receiving unit 13 is configured to receive an RRC CONNECTION RELEASE message at the end of a communication such as voice communication.

The receiving unit 13 is configured to extract the cell identification information, the location registration area information, the second RAT priority information, and the RAT indication information, from the received dedicated signaling information, and then to transmit the information to the determination unit 24.

When the determination unit 24 notifies that the location registration area for the mobile station UE is to be changed, the location registration controlling unit 21 is configured to perform location registration processing for the mobile station related to the notification.

When the determination unit 24 notifies that the RAT of the cell which the mobile station UE camps on is to be changed and that the mobile communication system compatible with the RAT is not unusable, the PLMN selection unit 22 is configured to perform "PLMN selection processing (PLMN selection)" on the mobile station UE related to the notification.

The storage unit 23 is configured to store the above-described first RAT priority information. The above-mentioned first RAT priority information designates a RAT to be preferentially used by the mobile station UE. The above-mentioned second RAT priority information may designate one or more RATs to be preferentially used by the mobile station UE.

The storage unit 23 may be configured to manage the first RAT priority information designated by a network (for example, a switching center) via the NAS protocol, or may be configured to manage the first RAT priority information designated by a user.

For example, the storage unit 23 is configured by using a USIM (User Subscriber Identity Module). The storage unit 23 is configured to write the first RAT priority information designated by a user to EFPLMNwAcT (User controlled PLMN selection unit with Access Technology) in the USIM, and to write the first RAT priority information designated by the network (for example, a switching center) to EFOPLMNwACT (Operator controlled PLMN selection unit with Access Technology) in the USIM.

The determination unit 24 is configured to determine whether or not the above-mentioned first RAT and the second RAT are the same and whether or not the above-mentioned first RAT and the third RAT are the same, and is configured to notify, to any of the location registration controlling unit 21, the PLMN selection unit 22, the display unit 31, and the camp-on processing unit 12, the determination result.

The determination unit 24 is configured to determine whether or not the location registration area of the mobile station UE is changed, whether or not the RAT of the cell which the mobile station UE camps on is changed, whether or not the mobile communication system compatible with the RAT is unusable, and the like, and is configured to notify, to any of the location registration controlling unit 21, the PLMN selection unit 22, the display unit 31, and the camp-on processing unit 12, the determination result.

When the first RAT is different from the second RAT, and when the first RAT coincides with the third RAT, the display unit 31 is configured to show that the mobile station UE is camping on under the first RAT.

For example, the display unit 31 may show a screen display or give a voice message that the mobile station UE is camping on under the first RAT.

(Operation of Mobile Communication System According to First Embodiment of Present Invention)

An operation of the mobile communication system according to the first embodiment of the present invention, specifically, an operation of a mobile station UE is described with reference to FIG. 3.

Figure 3:
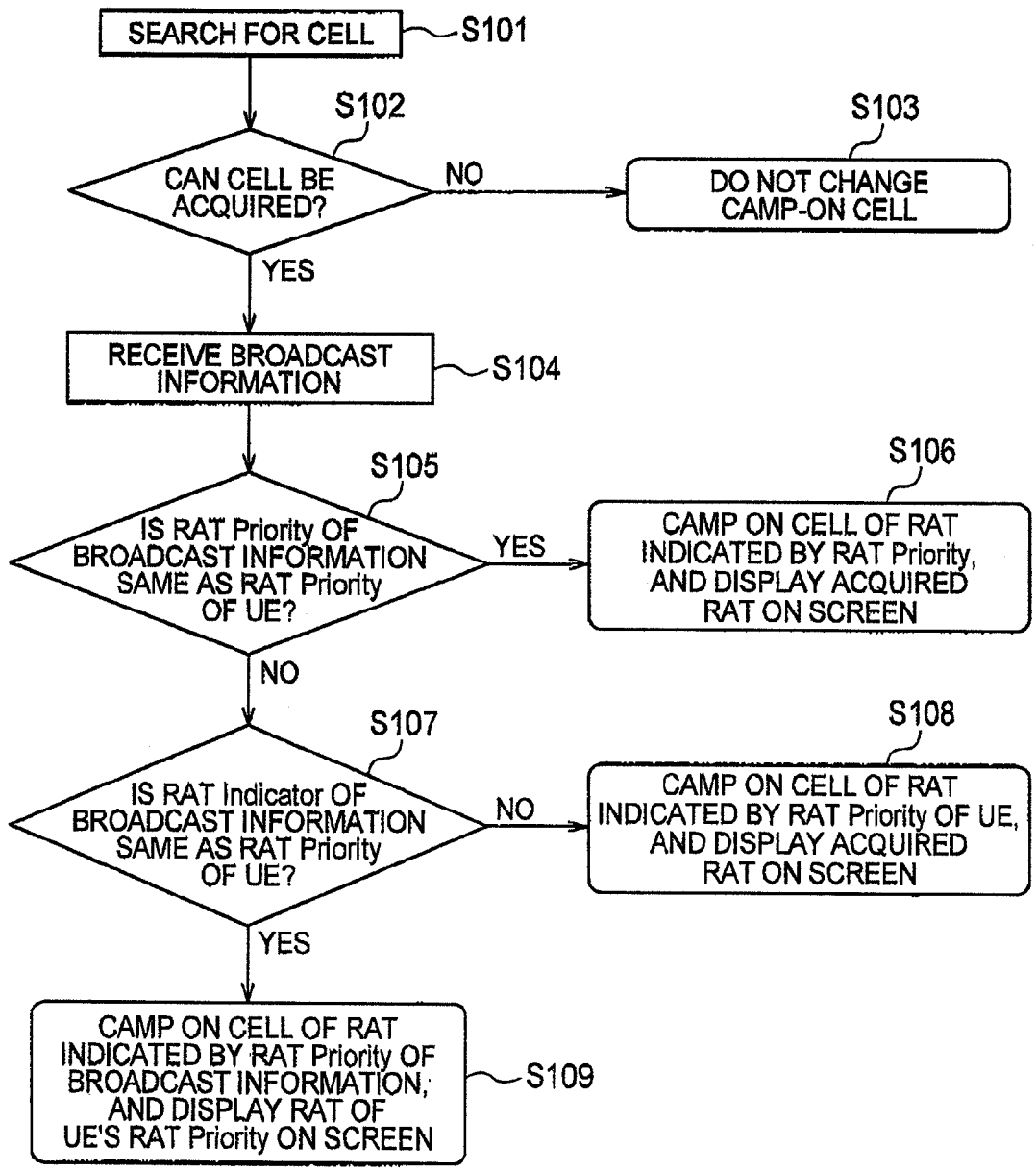
FIG. 3 is a flowchart showing the operation of a mobile station according to the first embodiment of the present invention.

As shown in FIG. 3, in step S101, the cell search unit 11 of the mobile station UE performs a cell search according to a predetermined trigger.

When the cell search unit 11 cannot acquire the broadcast information in peripheral cells (step S102), the camp-on processing unit 12 of the mobile station UE does not change the camp-on cell (step S103).

On the other hand, when the cell search unit 11 can acquire the broadcast information in the peripheral cells (step S102), in step S104, the receiving unit 13 of the mobile station UE receives and analyzes the broadcast information in the peripheral cells acquired by the cell search unit 11. Now, the camp-on processing unit 12 may camp on such peripheral cells.

In step S105, the determination unit 24 of the mobile station UE determines whether or not the second RAT designated by "the second RAT priority information (second RAT Priority)" included in the broadcast information is the same as the first RAT designated by "the first RAT priority information (first RAT Priority)" stored in the storage unit 23 of the mobile station UE.

If it is determined that the first RAT is the same as the second RAT, in step S106, the camp-on processing unit 12 camps on a cell of the first RAT (or the second RAT), and the display unit 31 of the mobile station UE shows that the mobile station UE is camping on under the first RAT (or the second RAT).

On the other hand, if it is determined that the first RAT is different from the second RAT, in step S107, the determination unit 24 determines whether or not the first RAT is the same as the third RAT designated by "the RAT indication information (RAT Indicator)" included in the broadcast information.

If it is determined that the first RAT is different from the third RAT, in step S108, the camp-on processing unit 12 camps on a cell of the first RAT, and the display unit 31 shows that the mobile station UE camps on the second RAT (or the third RAT).

On the other hand, if it is determined that the first RAT is the same as the third RAT, in step S109, the camp-on processing unit 12 camps on a cell of the first RAT (or the third RAT), and the display unit 31 shows that the mobile station UE is camping on under the first RAT (or the third RAT).

The features of the present embodiment described above may be expressed as follows.

A first aspect of the present embodiment is a mobile station summarized as follows. Specifically, the mobile station includes: a storage unit 23 configured to store first radio access technology priority information; a receiving unit 13 configured to receive second radio access technology priority information and radio access technology indication information from a radio base station; a camp-on processing unit 12 configured to camp on a cell of a second radio access technology designated by the second radio access technology priority information, when a first radio access technology designated by the first radio access technology priority information is different from the second radio access technology, and when the first radio access technology coincides with a third radio access technology designated by the radio access technology indication information; and a display unit 31 configured to show that the mobile station is camping on under the first radio access technology, when the first radio access technology is different from the second radio access technology, and when the first radio access technology coincides with the third radio access technology.

In the first aspect of the present embodiment, the camp-on processing unit 12 may be configured to camp on a cell of the second radio access technology, when the first radio access technology is different from the second radio access technology, when the first radio access technology coincides with the third radio access technology, and when a mobile communication system compatible with the second radio access technology is not unusable.

In the first aspect of the present embodiment, the receiving unit 13 may be configured to receive the second radio access technology priority information and the radio access technology indication information via broadcast information or dedicated signaling information.

In the first aspect of the present embodiment, the storage unit 23 may be configured to store the first radio access technology priority information based on an instruction from a switching center or an instruction by a user.

A second aspect of the present embodiment is a mobile communication method summarized as follows. Specifically, the mobile communication method includes the steps of: notifying, to a mobile station that stores first radio access technology priority information, second radio access technology priority information and radio access technology indication information; camping on a cell of a second radio access technology designated by the second radio access technology priority information by the mobile station, when a first radio access technology designated by the first radio access technology priority information is different from the second radio access technology, and when the first radio access technology coincides with a third radio access technology designated by the radio access technology indication information; and showing that the mobile station is camping on under the first radio access technology by the mobile station, when the first radio access technology is different from the second radio access technology, and when the first radio access technology coincides with the third radio access technology.

(Operations and Effects of Mobile Communication System According to First Embodiment of Present Invention)

With the mobile communication system according to the first embodiment of the present invention, on the assumption that the camp-on processing unit 12 of the mobile station UE camps on a cell of the UMTS scheme and the first RAT stored in the storage unit 23 of the mobile station UE is the "LTE scheme", when the second RAT designated by the second RAT priority information (the second RAT Priority) included in the broadcast information is the "UMTS scheme", and the third RAT designated by the RAT indication information (RAT Indicator) included in the broadcast information is the "LTE scheme", the camp-on processing unit 12 assumes that connection to a cell of the LTE scheme by the connection destination re-selection indication processing at a start of communication is assured, thus does not camp on a cell of the LTE scheme.

In such a case, when the display unit 31 shows that the mobile station UE is camping on a cell of the "LTE scheme", a sense of security can thereby be provided to the user.

In addition, with the mobile communication system according to the first embodiment of the present invention, when the mobile station UE receives the second RAT priority information and the RAT indication information via an RRC CONNECTION RELEASE message at the termination of a communication in a cell of the LTE scheme, and when the second RAT designated by the second RAT priority information is the "UMTS scheme" and the third RAT designated by the RAT indication information is the "LTE scheme", the camp-on processing unit 12 assumes that connection to a cell of the LTE scheme by the connection destination re-selection indication processing at a start of communication is assured, thus does not camp on a cell of the LTE scheme.

Also in such a case, when the display unit 31 shows that the mobile station UE is camping on a cell of the "LTE scheme", a sense of security can thereby be provided to the user.

Moreover, with the mobile communication system according to the first embodiment of the present invention, in the mobile communication system of the LTE scheme, even when the first RAT designated by the first RAT priority information notified via the NAS protocol is different from the second RAT designated by the first RAT priority information notified via the AS protocol, it is possible to value the second RAT and the third RAT notified by the AS protocol while making use of the first RAT notified by the NAS protocol. As a result, deterioration in usability can be prevented while contribution to an improvement in the utilization efficiency of a radio access network can be achieved.

In addition, with the mobile communication system according to the first embodiment of the present invention, even when the first RAT is different from the second RAT, the mobile station UE can avoid a situation where the camp-on cell needs to be changed between a cell of the first RAT and a cell of the second RAT.

It is only necessary for the user to communicate with a cell of the first RAT. For example, when a user wants to enjoy high-speed packet communication in the LTE scheme, setting to the "LTE scheme" as the first RAT is naturally assumed. In this case, however, it is only necessary for the user to communicate with a cell of the LTE scheme and thus not necessary to be conscious of which RAT's cell the mobile station UE camps on. That is to say, if communication can be made in a cell of the LTE scheme, the intention of the user or the network (switching center) can be assured to be achieved.

(Modification Examples)

Note that operation of the above described mobile station UE may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE. Also, the storage medium and the processor may be provided in the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile station comprising:
   a storage unit configured to store first radio access technology priority information;
   a receiving unit configured to receive second radio access technology priority information and radio access technology indication information from a radio base station;
   a camp-on processing unit configured to camp on a cell of a second radio access technology designated by the second radio access technology priority information,
      when a first radio access technology designated by the first radio access technology priority information is different from the second radio access technology, and
      when the first radio access technology coincides with a third radio access technology designated by the radio access technology indication information; and
   a display unit configured to show that the mobile station is camping on the first radio access technology,
      when the first radio access technology is different from the second radio access technology, and
      when the first radio access technology coincides with the third radio access technology,
   wherein the radio access technology indication information designates the third radio access technology as a target for connection destination re-selection indication processing, and the connection destination re-selection indication processing makes a mobile station start communication using the radio access technology of a different type from the radio access technology related to a communication start request transmitted by the mobile station that started communication.

2. The mobile station according to claim 1,
   wherein the camp-on processing unit is configured to camp on a cell of the second radio access technology,
   when the first radio access technology is different from the second radio access technology,
   when the first radio access technology coincides with the third radio access technology, and
   when a mobile communication system compatible with the second radio access technology is not unusable.

3. The mobile station according to claim 1,
   wherein the receiving unit is configured to receive the second radio access technology priority information and the radio access technology indication information via broadcast information or dedicated signaling information.

4. The mobile station according to claim 1,
   wherein the storage unit is configured to store the first radio access technology priority information based on an instruction from a switching center or an instruction by a user.

5. A mobile communication method comprising the steps of:
   notifying, to a mobile station that stores first radio access technology priority information, second radio access technology priority information and radio access technology indication information;

camping, by the mobile station, on a cell of a second radio access technology designated by the second radio access technology priority information,
   when a first radio access technology designated by the first radio access technology priority information is different from the second radio access technology, and
   when the first radio access technology coincides with a third radio access technology designated by the radio access technology indication information; and
showing, by the mobile station, that the mobile station is camping on the first radio access technology,
   when the first radio access technology is different from the second radio access technology, and
   when the first radio access technology coincides with the third radio access technology,
wherein the radio access technology indication information designates the third radio access technology as a target for connection destination re-selection indication processing and the connection destination re-selection indication processing makes a mobile station start communication using the radio access technology of a different type from the radio access technology related to a communication start request transmitted by the mobile station that started communication.

* * * * *